(12) United States Patent
Witbrock et al.

(10) Patent No.: US 7,734,623 B2
(45) Date of Patent: Jun. 8, 2010

(54) SEMANTICS-BASED METHOD AND APPARATUS FOR DOCUMENT ANALYSIS

(75) Inventors: Michael John Witbrock, Austin, TX (US); David Andrew Schneider, Austin, TX (US); Benjamin Paul Rode, Leander, TX (US); Bjoern Aldag, Austin, TX (US)

(73) Assignee: Cycorp, Inc., Austin, TX (US)

( * ) Notice: Subject to any disclaimer, the term of this patent is extended or adjusted under 35 U.S.C. 154(b) by 394 days.

(21) Appl. No.: 11/706,716

(22) Filed: Feb. 15, 2007

(65) Prior Publication Data

US 2008/0109212 A1    May 8, 2008

Related U.S. Application Data

(60) Provisional application No. 60/857,379, filed on Nov. 7, 2006.

(51) Int. Cl.
*G06F 7/00*   (2006.01)
*G06F 17/27*  (2006.01)

(52) U.S. Cl. ............................. 707/723; 704/9; 704/10; 706/46; 706/47; 706/56

(58) Field of Classification Search ................ 707/366, 707/3, 6; 704/9, 10; 706/46, 47, 56
See application file for complete search history.

(56) References Cited

U.S. PATENT DOCUMENTS

| | | | |
|---|---|---|---|
| 6,317,708 B1 | 11/2001 | Witbrock | |
| 6,473,778 B1 | 10/2002 | Gibbon | |
| 6,581,057 B1 | 6/2003 | Witbrock | |
| 6,675,159 B1 * | 1/2004 | Lin et al. ................... | 707/3 |
| 6,678,413 B1 | 1/2004 | Liang | |
| 6,701,309 B1 | 3/2004 | Beeferman | |
| 6,856,957 B1 | 2/2005 | Dumoulin | |
| 6,944,609 B2 | 9/2005 | Witbrock | |
| 7,089,188 B2 | 8/2006 | Logan | |
| 7,228,493 B2 | 6/2007 | Kosak | |
| 2005/0160107 A1 * | 7/2005 | Liang ....................... | 707/100 |

OTHER PUBLICATIONS

Alexandros et al. "The Infocious Web Search Engine: Improving Web Searching Through Linguistic Analysis", ACM, May 5, 2005.*
Liu et al. "Content-Based audio classification and retrieval using a fuzzy logic system: towards multimedia search engines", p. 357-364, copyright 2002, Springer-Verlag.*
Richardson et al. "Markov logic networks", published online Jan. 27, 2006, Springer Science.*

* cited by examiner

*Primary Examiner*—Etienne P LeRoux
*Assistant Examiner*—Cindy Nguyen
(74) *Attorney, Agent, or Firm*—Winstead P.C.

(57) ABSTRACT

A system and method for producing semantically-rich representations of texts to amplify and sharpen the interpretations of texts. The method relies on the fact that there is a substantial amount of semantic content associated with most text strings that is not explicit in those strings, or in the mere statistical co-occurrence of the strings with other strings, but which is nevertheless extremely relevant to the text. This additional information is used to both sharpen the representations derived directly from the text string, and also to augment the representation with content that, while not explicitly mentioned in the string, is implicit in the text and, if made explicit, can be used to support the performance of text processing applications including document indexing and retrieval, document classification, document routing, document summarization, and document tagging. These enhancements may be used to support down-stream processing, such as automated document reading and understanding, online advertising placement, electronic commerce, corporate knowledge management, and business and government intelligence applications.

43 Claims, 3 Drawing Sheets

SEMANTICS-BASED METHOD AND APPARATUS FOR DOCUMENT ANALYSIS

CROSS-REFERENCE TO RELATED APPLICATIONS

This non-provisional application claims priority based upon prior U.S. Provisional Patent Application Ser. No. 60/857,379 filed Nov. 7, 2006 in the names of Michael John Witbrock, David Andrew Schneider, Benjamin Paul Rode, and Bjoern Aldag, entitled "A Semantics-Based Method and Apparatus for Selecting Interpretations of Text Strings."

BACKGROUND AND SUMMARY OF THE INVENTION

The Internet and other computer networks have become the backbone of information transfer. In that regard, effective analysis and searching of associated data stores is paramount. A great many applications of computer technology would be better enabled and enjoy enhanced robustness and completeness if it were possible for automatic machines to process the meaning contained in spoken or written natural language. Previously, such interpretations were derived either from the lexical items occurring in the documents themselves, or from a statistical model derived from the corpus in which the documents appear, a larger corpus of documents, or both.

A novel system and method is accordingly disclosed for producing semantically rich representations of texts that exploits semantic models to amplify and sharpen the interpretations of texts. This method is applicable not only for producing semantic representations of texts, but also for matching the representations of multiple texts. The method relies on the fact that there is a substantial amount of semantic content associated with most text strings that is not explicit in those strings, or in the mere statistical co-occurrence of the strings with other strings, but which is nevertheless extremely relevant to the text.

This additional information may be used to sharpen the representations derived directly from the text string, and also to augment the representation with content that, while not explicitly mentioned in the string, is implicit in the text and, if made explicit, can be used to support the performance of text processing applications including document indexing and retrieval, document classification, document routing, document summarization, and document tagging. These enhancements also support down-stream processing, such as automated document reading and understanding, online advertising placement, electronic commerce, corporate knowledge management, and business and government intelligence applications.

BRIEF DESCRIPTION OF THE DRAWINGS

The foregoing and other advantages of the invention will become apparent upon reading the following detailed description and upon reference to the drawings, wherein.

Figure 1:
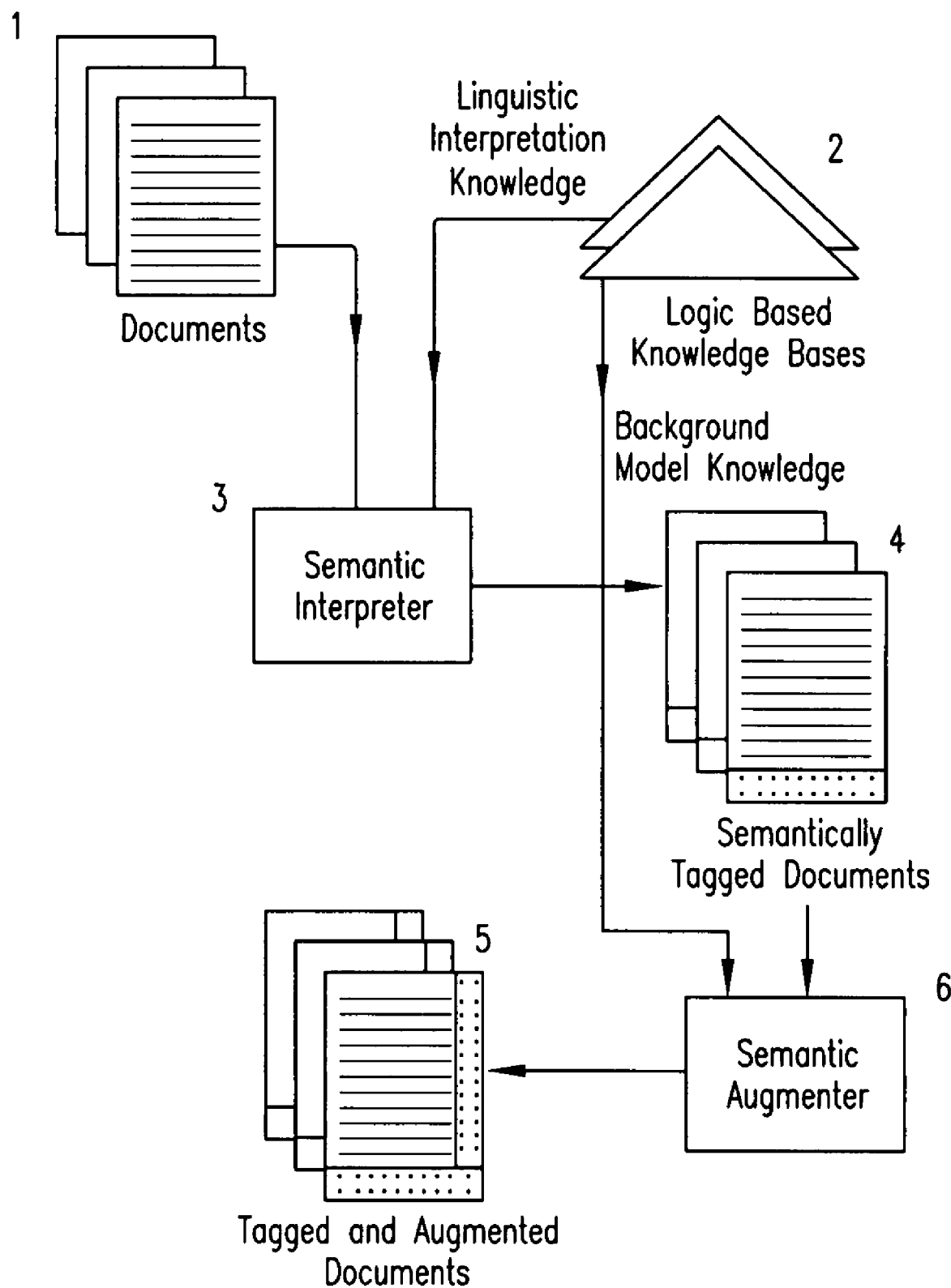
FIG. 1 is a data flow diagram illustrating one embodiment of the present invention wherein semantic representations of data stores are utilized.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As referenced above, embodiments of the invention provide a semantic-model based system and method for interpretation, analysis and search of text. In addition, the model can be advantageously applied to diagrams, information describing images, transcriptions of speech, descriptors of musical recordings, etc.

A novel system and method is disclosed for producing semantically rich representations of texts that exploits semantic models to amplify and sharpen the interpretations of texts. This method is applicable not only for producing semantic representations of texts, but also for matching the representations of multiple texts. The method relies on the reality that there is a substantial amount of semantic content associated with most text strings that is not explicit in those strings, or in the mere statistical co-occurrence of the strings with other strings, but which is nevertheless extremely relevant to the text. This additional information is used to both sharpen the representations derived directly from the text string, and also to augment the representation with content that, while not explicitly mentioned in the string, is implicit in the text and, if made explicit, can be used to support the performance of text processing applications including document indexing and retrieval, document classification, document routing, document summarization based on generalized summaries that can be instantiated by specific annotated terms in a document or otherwise, automated linking between documents, detection of inconsistencies between documents and document tagging with document meta-features, such as the attitude or affective disposition of the author, or the nature of the intended target audience. These enhancements may then be used to support down-stream processing, such as automated document reading and understanding, online advertising placement, electronic commerce, corporate knowledge management, identification of collaboration or social-networking opportunities between information users based on the meaning of the information they access or produce, and business and government intelligence applications.

The method utilizes semantic models external to the text itself that contain information that can be, in a preferred embodiment, used both to slice away possible interpretations of the string that are incorrect, and also to augment the representation with additional relevant concepts. To illustrate the latter, consider the string "George W. Bush signed the budget act today." A simple representation of this string would include concepts for "George W. Bush", "signed", "budget act", and "today". However, implicit in this string are the concepts "President of the United States" and "become law"; a more complete representation of the string would thus include those two additional concepts.

The system can match information in the text itself with semantic models represented in a logic-based representation (including, but not limited to, predicate-calculus based logical knowledge bases like Cyc and knowledge bases represented in description logics, probabilistic logics including Markov logic and lifted first order predicate calculus, propositional logics, and modal logics, and including, but not limited to knowledge bases constructed partially or completely by hand, or partially or completely automatically, including by automated reading, automatic induction of knowledge, automated abduction, and other means of automated knowledge discovery and verification) to augment the representation with additional concepts, relations, assertions and collections of assertions from the model. The concepts from the model may be weighted by, amongst other means including the standard corpus-based and document based weightings generally used in natural language processing (NLP), according to how closely they match the document's initial representation, and/or according to their prominence in the external model.

To illustrate, without limiting the scope of what is claimed in the invention, by way of an application in Information Retrieval, suppose that a user, as one might typically do, enters a single word query "TxDOT" into a web search engine. Currently, a search engine will search for documents that contain that string. They will not, unless on statistical grounds, prefer documents mentioning, for example, the current head of TxDOT, or Texas, or transportation, or vehicle registration, or online services, or highways, even though all of these terms and concepts have specific semantic relationships to TxDOT and, all of which, should they occur, are indicative of an article being more relevant to TxDOT than one that simply mentions the organization by name. Disclosed is a semantic model, including background information such as information about the structure of organizations, and specific information, such as particular roles prominent people play in organizations, to augment queries and enhance or enable retrieval of relevant documents. The same sort of models can also be used effectively inside documents, since terms that are mutually consistent with a semantic model should account for proportionately more of the relevance score a document gets than is accounted for by terms whose appearance cannot be thus explained. This application of semantic models goes beyond techniques like blind relevance feedback or latent semantic indexing, which will only add search terms that happen to frequently co-occur statistically with the target term in documents.

A single semantic model need not account for the terms appearing in either a query or a document. To the contrary, there may be several semantic models for a query term like "ACL" for example, one of them consistent with its interpretation as referring to the Association for Computational Linguistics, one as referring to the Association of Christian Librarians, one referring to the Austin City Limits music festival, and one referring to the Access Control Lists used in computer filing systems. Moreover, ACL occurring in a document together with the word "library" supports both the Access Control List and Association of Christian Librarians semantic models.

Because a document may be consistent with several different models, it may be useful to compute several different representations of a document, each consistent with a different semantic model. For example, in the case above, the concept "library" will have added weight in the representations for both Association of Christian Librarians and Access Control List. However, the concept "librarian", if evoked by a document, would have a higher weight for the representation of the document that is consistent with Association of Christian Librarians, while the concept "file permissions" will have a higher weight in the representation focused on Access Control List. If the information retrieval query "music Zilker" is encountered, the query would be expanded by the invention to include "Austin City Limits musical festival" because the music festival is consistent with both "music" and "Zilker" (the park where the festival takes place). The query representation will also be expanded to include different genres of music (e.g. Rock music, classical music, Jazz), because they are consistent with "music", but not with particularly high weights, as there is no close semantic link between Zilker Park and musical genres.

A principal embodiment of the method contemplated herein, and the applications it enables, involves assigning precise, standardized interpretations to substrings in a spoken or textual document that represent the semantics of the concepts or assertions, or possible concepts or interpretations that those substrings represent, in a form more amenable to further processing than the original strings. Often, because of the ambiguity of language, or because of insufficiency of knowledge of the context in which that language should be interpreted, the number of possible interpretations of a language string is very large; accordingly, it is difficult for "downstream" processing to correctly choose amongst possible actions that may depend on the interpretation.

It is therefore of great value to these interpretation assignment systems (of which "Information Extraction" and "Fact Extraction" systems form notable subclasses), and to the applications to, amongst others, information retrieval and summarization that are described in this disclosure, if means can be found to identify which of the possible interpretations are more or less probable, or more or less certain, given an interpretation context. Prior art "Information Extraction" systems that have used imprecise semantic descriptions (e.g., Organization, Weapon, Person, Place), required far less disambiguation, and this was therefore a less vital concern. Previous IE systems did, however, address a restricted form of this problem when performing co-reference resolution—for example, determining that a reference to "Bill Clinton" referred to the same entity as a reference to "President Clinton". This invention involves methods that are designed to be used over many more types of descriptions (i.e., not just individual entities).

Generally, some interpretations are substantially less probable than others. For example, the interpretation of "dog" as meaning hot-dog or even, atavistically, foot, is, far less probable than the interpretation as a reference to canines. The present invention makes use of this asymmetry: only high-probability interpretations are admitted by default; other, low probability interpretations are admitted only if they are licensed by the application of a semantic model. In other cases, high-probability interpretations may be specifically de-licensed on the basis of context implicit in the document combined with relevant sections of a semantic model, leaving low probability interpretations, or no interpretation at all. This sort of license can take many forms, enumerated without limitation of scope in the claims, and described in broad terms in the following paragraphs.

To illustrate the licensing process, suppose that a news article contained the text "*Chicago opened the 2007 season at Wrigley by putting Aardsma and Mateo in to pitch*". The English word Chicago has many possible interpretations, depending on context, beyond its usual, high probability meaning "the city of Chicago, Ill." (CityOfChicagoIL in the OpenCyc (http://opencyc.org) semantic vocabulary which is used for the purposes of illustration, but does not narrow the scope of the claimed invention), including Chicago-The-Movie, UniversityOfChicago and ChicagoCubs. It is clearly this final meaning that is meant in this context, not the city, and this is because other terms are used in the context that are logically related to the Chicago Cubs, namely the word "pitch", which refers to a required sub-event in a baseball game, the playing of which is a necessary part of the job of the members of the Chicago Cubs by virtue of their status as members of a professional baseball team. Similarly, the mention of two members of the Chicago Cubs, Aardsma and Mateo, licenses the interpretation, as does the mention of one Wrigley, which can refer to Wrigley Field, the Cubs' home.

By comparison, the word "pound", which, all other things being equal, should be taken to mean Pound-UnitOfMass, has this meaning delicensed if the word appears in the same sentence as a term meaning Pence-GreatBritain in favor of Pound-GreatBritian, which in turn, is licensed. In this way, licensing not only adds an interpretation that would not otherwise have been considered, but removes alternative, likely incorrect, interpretations.

In the discussion above, in which the ChicagoCubs meaning of "Chicago" was licensed, it is worth noting that the relationships used for license involve both general and specific knowledge. The specific knowledge, for example, that the Chicago Cubs is a baseball team, the general knowledge that professional sports teams have a small number of members and that those members are specific to the team, and the specific knowledge that Aardsma and Mateo, inter alia, are such members. An important feature of this invention, in one implementation, is that the licensing and delicensing rules, which otherwise would have to be individually constructed for every term to be disambiguated, are cost-effectively derived in their specific form by applying knowledge that is contained in a knowledge base, or knowledge bases, designed to support one or more forms of automated inference.

A further feature, in one implementation, is the use of the knowledge base to compute not only the very specific semantic terms used to annotate the document, but to produce annotations with generalizations of and materials related to those terms, to allow for efficient, precompiled inferences at the time the annotation is used. For example, in addition to the specific term PatentFiling being used to annotate "filing for patent protection" in a document, the more general term RequestingAction would also be added to the annotation, including the fact that the relationship is generalization. This would allow a search for "requests for action" to retrieve the document with the original phrase to as quickly as a search for "patent filing" would. Moreover, since the annotation includes the nature of the relationship between the terms, a retrieval engine operating on the basis of these annotations would be able to explain why the document was retrieved: because it contains a term that describes a more specific form of the thing searched for. Similarly, by annotating the document with defining sub-events of the PatentFiling, documents referring to office actions could be retrieved during a search for "patent filings", with no decrease in search speed. To illustrate further, the term "Ford" may be matched in a document during a search for "vehicle manufacturer" because the system has precomputed (in one implementation) the association between "FordCompany" and "(ManufacturerFn MotorVehicle)" because Ford is known to be a "(ManufacturerFn Truck)" and "Truck" is known to be a kind of "MotorVehicle", and because the word "truck" appears in the document, licensing the interpretation of "Ford" as the company, not the water crossing. This licensing relationship, along with other semantic connections between document terms can be used, inter alia, to augment the term weights of the affected terms for use in document retrieval, document summarization, and other applications. Further, in one implementation, the system could store a record of the use of these relationships to associate "Ford" with "VehicleManufacturer", enabling, inter alia, the system to describe why it retrieved the document, or enabling the user to instruct the system to prefer or disprefer the use of certain kinds of information (e.g. information about products manufactured by companies) in the relevant application (Information retrieval, in this illustration).

Turning now to FIG. 1, a data flow diagram illustrates one embodiment of the present invention wherein semantic representations of data stores are utilized. Documents 1 are submitted to a semantic interpreter 3, generating semantically-tagged documents 4. The semantic interpreter 3 is enabled with a logic-based knowledge base 2. Semantically tagged documents 4 are passed through a semantic augmenter 5, which augments the semantic tagging of the documents 4 with semantic tags implicit in the combination of their semantic tags and knowledge in the knowledge base 2, and optionally weights terms in the documents 4 based in part on the degree to which the occurrence of terms within portions of the documents 4 can be shown to be licensed based on a combination of semantic tags and knowledge in the knowledge base 2, resulting in semantically tagged documents 6.

Figure 2:
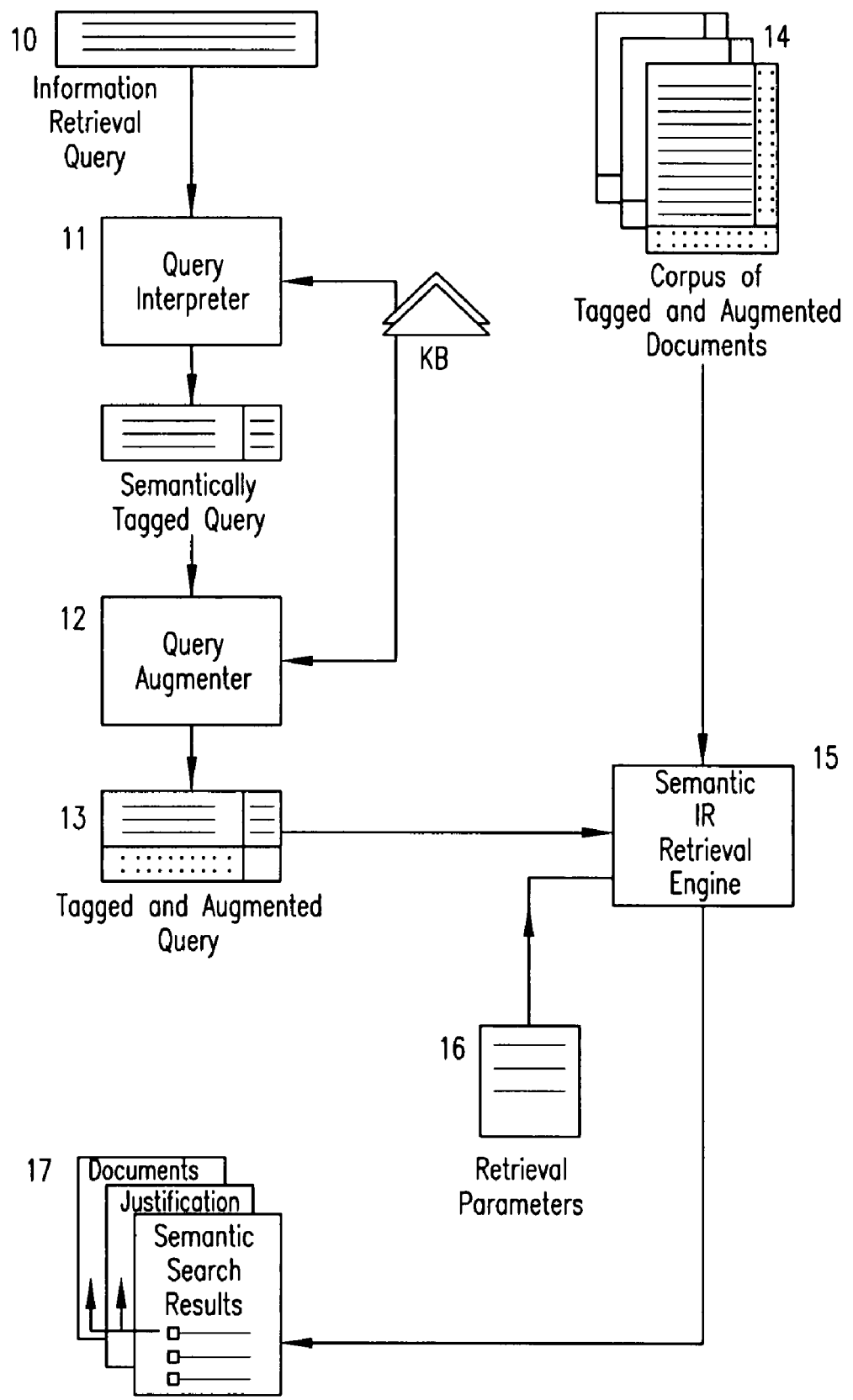
FIG. 2 is a data flow diagram illustrating semantic search results including available explanations for why documents are retrieved and access to tagged and original documents.

FIG. 2 shows a natural-language processing model for a search query processing device 9 operating with a semantic model in accordance with the present invention. Information retrieval queries or statements of information needs 10 are processed by a query interpreter 11 and augmenter 12 acting in the manner of the document processing system in FIG. 1 wherein the query 10 acts as Documents 1 in FIG. 1, resulting in semantically tagged query and augmented query 13. The original terms, semantic tags and weights are compared with the terms, tags and weights of documents in the semantically tagged and augmented document corpus 14 within semantic IR retrieval engine 15, in a manner moderated by retrieval parameters 16 to produce a ranked subset of least some of the documents 14, presented for use in a form determined processing information in the corresponding annotated documents 14 and augmented query 13, allowing their presentation in a pleasing form as semantic search results 17, which may, among a plurality of other presented attributes, include the means to display explanations of why the document was retrieved.

Figure 3:
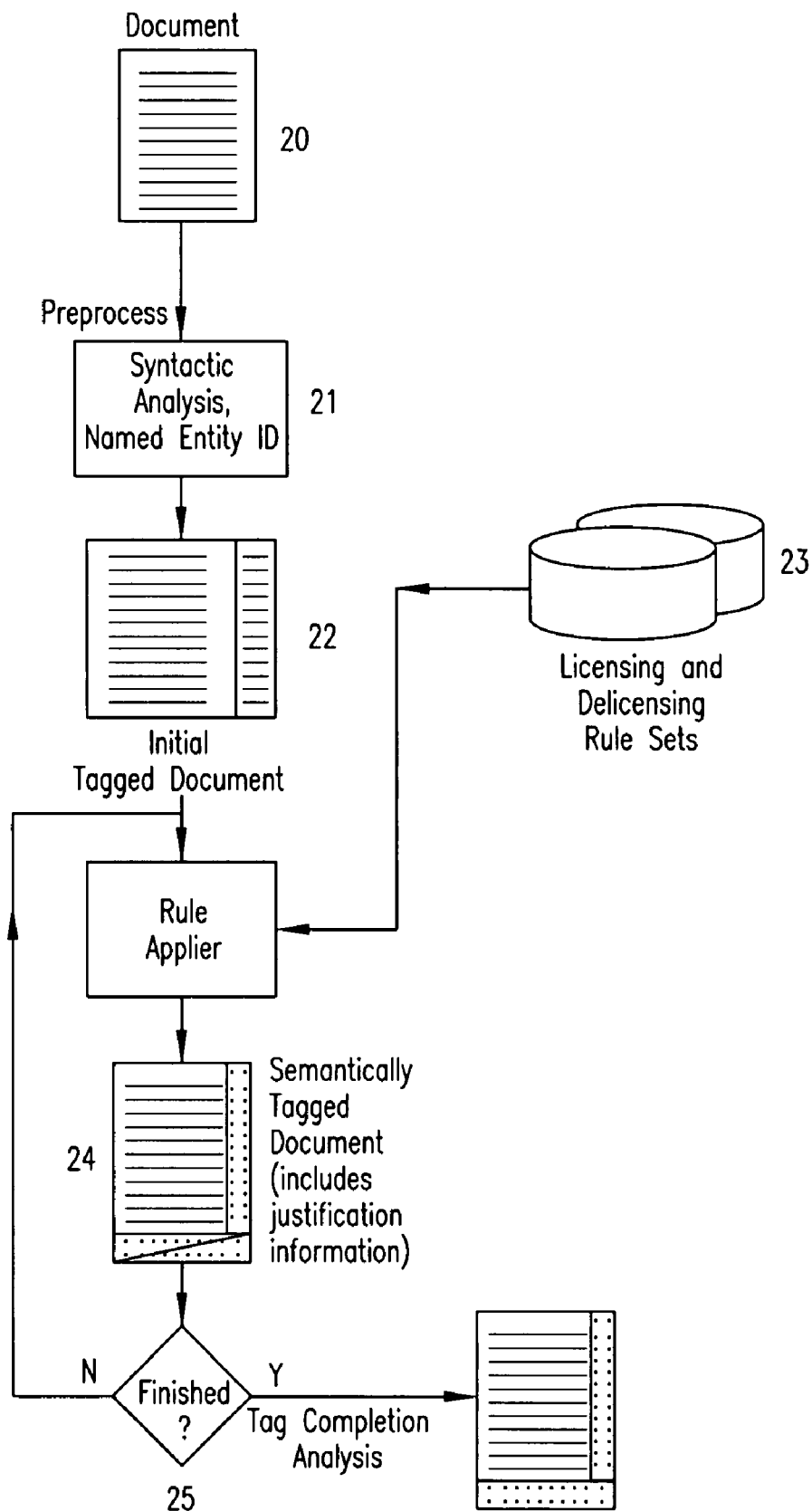
FIG. 3 is a data flow diagram illustrating one embodiment of a semantic interpreter in accordance with an embodiment of the present invention.

FIG. 3 provides further detail of one embodiment of a semantic interpreter 3 as shown in FIG. 1. An input document 20 is subject to language preprocessing 21, including syntactic analysis and named entity tagging according to the current art to produce an initial tagged document 22. This document is processed by a rule applier 23, which operates by applying rules derived from a knowledge base directly or by means of inference, but stored for efficient application as licensing and delicensing rule sets 23. As each rule relevant to the terms and tags in the initial tagged document 22 or output document 24 is applied, to modify the annotation producing a new version document 24, a tag completion analyzer, 25, determines whether remaining rules are available and should be applied. If not, the current document 24 is made available for further processing or storage as final tagged document.

When understanding the scope of the invention, the documents to be processed as described may include, but are not limited to, spoken, audio or musical, written, dialog, images, moving images, computer-rendered graphics, information graphics, or any combination thereof, and the annotation process described may be used to reduce ambiguity within any set of possible semantic interpretations of features of said documents, produced by any suitable set of document processing means. For example, spoken documents may be preprocessed by being transcribed by a speech recognition system, and the resulting transcription automatically, but ambiguously tagged, by a statistically weighted annotation system.

Generally, facts and rules in the knowledge base are represented in a k-th order predicate calculus. In one embodiment, K=1 and the representation is first order predicate calculus. The predicate calculus may be, in a preferred embodiment, extended to support modal logic. In another preferred embodiment, Facts are represented in propositional logic. In another preferred embodiment, Facts and rules in the knowledge base are represented in a probabilistic logic. In another preferred embodiment, The probabilistic logic is a first order probabilistic predicate logic. In another preferred embodiment, The representation is a Markov Logic Network. In another preferred embodiment, The representation is lifted first order probabilistic logic. In another preferred embodiment, the representation used is a combination or a plurality of logical or other formal representations, possibly including but not limited to, the foregoing.

Certain of the licensing rules may be based, in part, upon a statistical analysis of the frequency with which precise semantic interpretations of terms co-occur, either with one another, or with terms or phrases in natural language, or with meta-data about a document, such as its file-type, country of publication, location within a filing system, author, or other similar data.

1. Example of a Rule Disambuator

In a preferred embodiment, the rule disambiguator transforms a natural language document whose words have been tagged with substantially all possible senses for each word into a document whose words are tagged only with senses appropriate for the context.

To achieve this in one embodiment designed to improve the efficiency of the tagging system, a large set of rules, generated by automated inference from more general rules, that either allow (license) or disallow (delicense) a specific sense in the given document context can be consulted during disambiguation. A sense is kept for a word only if it is licensed by the rule set; otherwise, it is discarded.

2. Rules 2.1 Rule Format and Interpretation

In one embodiment of the rule system described above, each rule has the form:

<sense>->((<sign>.<licensing sense>) . . . (<sign>.<licensing sense>))

where <sense> is a specific word sense (e.g. a Cyc term), each <sign> is either + or −, and each <licensing sense> is a logical term, such as a Cyc term. <sense> is called the rule's head, and each (<sign>.<licensing sense>) is called a clause of the rule.

Each clause of a rule either encourages <sense> (if <sign> is + and <licensing sense> is found somewhere in the document) or discourages <sense> (if <sign> is − and <licensing sense> is found somewhere in the document). The interpretation of the entire rule consults all clauses and combines their recommendations to either license or delicense the rule's head. One rule interpretation will license a word sense if at least one clause encourages the sense and no clause discourages the sense, but other implementations are imaginable.

As an example of the operation of this embodiment of the sense-disambiguation function employed in this invention, to assign the correct sense to the ambiguous noun "bat" that has the two possible Cyc senses #$Bat-Mammal or #$Baseball-Bat, one might write, or generate via some form of logical inference, two rules:

$Bat-Mammal->((+.#$Cave)(+.#$Bridge) (−.#$Baseball). . . )

$BaseballBat->((+.#$BaseballInning)(+.#$HittingAHomeRun). . . )

stating that the sense #$Bat-Mammal is encouraged by the presence of #$Cave and #$Bridge elsewhere in the document, but discouraged by the presence of #$Baseball. Similarly, #$BaseballBat is encouraged by the presence of other baseball related terms in the context.

2.2 Rule Generation

The rules introduced above can be manually generated, but the vast majority would be generated automatically from a knowledge base using a small set of (meta)rules that are applied, using an inference engine to infer the disambiguation rules.

For example, using the Cyc KB and inference engine by defining two binary CycL predicates, e.g.:

(#$isLicensedBy<sense><licensing sense>)

(#$isDelicensedBy<sense><deliquescing sense>)

that correspond directly to the rules introduced in 2.1, it is possible to assert #$isLicensedBy/#$isDelicensedBy facts directly, or write CycL rules that permit the inference of #$isLicensedBy and #$isDelicensedBy facts. These are then trivially translated into the disambiguation rule format.

For example, one may either assert a disambiguation fact such as:

(#$isLicensedBy #$Bat-Mammal #$Cave)

directly, or write general CycL rules including by way of example:

(#$implies
  (#$and
  (#$isa ?CITY #$City)
  (#$geographicalSubRegionsOfState ?STATE ?CITY))
  (#$isLicensedBy ?CITY ?STATE))

that permit the system to infer a very large number of disambiguation rules that license particular city word senses only in the presence of the state that the city is in. For example, with the CycL city rule above, the system could infer the specific disambiguation rule:

(#$is LicensedBy #$Paris-Texas #$Texas-State)

that will allow the #$Paris-Texas meaning only if a term meaning #$Texas-State is found elsewhere in the document.

3. Further Details of Disambiguation and Augmentation Algorithm

In a preferred embodiment of the invention, the disambiguation algorithm component expects a document whose words are tagged with possible senses, given the part of speech of the word.

In the first pass, it moves through the document word by word and gathers all senses of each word in a single sense set. In the second and actual disambiguation pass, it looks at each sense of each word, fetches the disambiguation rule whose head is that sense, and applies the clauses of the rule together with the sense set built in the first pass to either license or delicense the sense. In a third pass, it moves through the senses determined, and delicensed senses are removed from the word and licensed senses are kept.

Subsequent to the operation of the Disambiguation algorithm, in an augmentation pass, the system moves through the words and the senses determined by the disambiguation algorithm, augmenting them with knowledge contained or implicit in the background KB, and possibly adjusting term and sense relevance weights based on the degree to which the senses are connected.

The invention thus includes a system for augmenting representations of textual strings using background knowledge contained in a logic-based representation by producing logical representations of possible interpretations of substrings of the processed textual strings, locating those logical representations within a knowledge base, retrieving background knowledge from the knowledge base, and augmenting the text strings with encoded knowledge from the knowledge base.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed:

1. A method for ranking search results comprising:
    receiving a plurality of search terms;
    for each of said search terms, forming disambiguated interpretations with respect to an ontology;
    using said disambiguated interpretations during said search to define a set of results comprising a plurality of documents; and
    weighting, by a processor, said plurality of documents in accordance with an extent to which each of said plurality of documents is semantically coherent with said disambiguated interpretations;
    wherein said disambiguated interpretations are derived from a predicate calculus representation.

2. A method for ranking search results comprising:
    receiving a plurality of search terms;
    for each of said search terms, forming disambiguated interpretations with respect to an ontology;
    using said disambiguated interpretations during said search to define a set of results comprising a plurality of documents; and
    weighting, by a processor, said plurality of documents in accordance with an extent to which each of said plurality of documents is semantically coherent with said disambiguated interpretations;
    wherein said disambiguated interpretations are stored in a knowledge base;
    wherein said knowledge base is represented using a probabilistic predicate calculus-based logic.

3. The method of claim 2, wherein said probabilistic predicate calculus is a first order probabilistic logic.

4. The method of claim 3, wherein said probabilistic logic is Markov Logic.

5. The method of claim 3, wherein said probabilistic logic is lifted first order predicate calculus.

6. A method for ranking search results comprising:
    receiving a plurality of search terms;
    for each of said search terms, forming disambiguated interpretations with respect to an ontology;
    using said disambiguated interpretations during said search to define a set of results comprising a plurality of documents;
    weighting, by a processor, said plurality of documents in accordance with an extent to which each of said plurality of documents is semantically coherent with said disambiguated interpretations; and
    displaying said disambiguated interpretations for at least one of said search terms to a user.

7. The method of claim 6, further comprising receiving user input deselecting one or more of said disambiguated interpretations.

8. The method of claim 6, wherein said displaying step is performed when said user mouses over said at least one of said search terms.

9. A method for semantically augmenting textual strings comprising:
    electronically analyzing a first document comprising a plurality of textual strings;
    for each of said plurality of textual strings, identifying a logical representation corresponding to a set of possible interpretations of that textual string;
    locating said logical representation within a knowledge base;
    retrieving said set of possible interpretations from the knowledge base; and
    augmenting, by a processor, each of said text strings with one or more string augmentations corresponding to said possible interpretations.

10. The method of claim 9, wherein said knowledge base is represented using predicate calculus.

11. The method of claim 9, wherein said corresponding string augmentations are derived from a predicate calculus representation.

12. The method of claim 9, wherein said knowledge base is represented using a probabilistic predicate calculus-based logic.

13. The method of claim 12, wherein said probabilistic predicate calculus is a first order probabilistic logic.

14. The method of claim 13, wherein said probabilistic logic is Markov Logic.

15. The method of claim 13, wherein said probabilistic logic is lifted first order predicate calculus.

16. The method of claim 9, further comprising:
    receiving a search string;
    identifying a second logical representation corresponding to said search string;
    locating said second logical representation within a knowledge base;
    retrieving a second set of possible interpretations from said knowledge base; and
    augmenting said second search string with one or more search string augmentations corresponding to said second set of possible interpretations.

17. The method of claim 16, wherein said first document is augmented with a retrieval weight determined at least in part by a degree to which said string augmentations are consistent with an underlying semantic model.

18. The method of claim 17, wherein said retrieval weights are determined at least in part by applying a set of specific rules for combining said background knowledge with the contents of said first document.

19. The method of claim 16, whereby said augmentation step is performed to enhance information retrieval.

20. The method of claim 9, further comprising displaying said disambiguated interpretations for at least one of said search strings to a user.

21. The method of claim 20, wherein said displaying step is performed when said user mouses over said one of said search string.

22. The method of claim 16, further comprising searching a database comprising said first document and utilizing said string augmentations to produce a set of search results identifying said first document.

23. The method of claim 22, wherein said augmentation step comprises automatically generating a natural language rendering of related information contained in said background semantic model, and these natural language renderings are added inline or as meta-information to the queries or content.

24. The method of claim 9, further comprising attributing a rank to said first document.

25. The method of claim 16, further comprising retrieving a plurality of documents containing at least one of said search string augmentations.

26. The method of claim 16, wherein said query is accumulated in the form of a persistent query model over time on the basis of a series of searches performed by one or more users.

27. The method of claim 9, further comprising identifying a relevant semantic model prior to a time said first document is used by said user, and storing said relevant semantic model in said knowledge base.

28. The method of claim 9, wherein said knowledge base comprises a description of the derivation process used to associate a model with said first document.

29. The method of claim 9, further comprising providing one or more of said string augmentations to a user.

30. The method of claim 29, further comprising selecting one of said string augmentations based upon an input from a user.

31. The method of claim 30, wherein said user's input is based at least in part on an application operated by said user.

32. The method of claim 31, further comprising modifying said knowledge base, thereby affecting the representation of the text string, based upon an instruction by said user.

33. The method of claim 9, further comprising licensing at least one of said string augmentations for a first text string upon determining that at least one of said string augmentations is relevant.

34. The method of claim 9, further comprising delicensing at least one of said string augmentations for a first text string upon determining that said at least one of said string augmentations is irrelevant.

35. A system in support of information search, information extraction and information retrieval, comprising:
a plurality of computing devices,
a plurality of databases, each of which comprises a plurality of documents comprising a plurality of text strings;
a knowledge database communicatively coupled to said devices via a network, said knowledge database comprising a set of semantic representations for each of said plurality of text strings;
a search engine responsive to said computing devices adapted to receive a search string and identify a subset of documents from all of said pluralities of documents on said plurality of databases utilizing said semantic representations, and ranking said subset of documents in accordance with a degree of coherence between said search string and each document of said subset of documents.

36. The search system of claim 35, wherein said databases comprise non-textual information.

37. The search system of claim 36, wherein said knowledge base comprises semantic representations for at least some of said non-textual information.

38. The search system of claim 37, wherein said semantic representations from non-textual sources are used in identifying said subset of documents.

39. The search system of claim 35, wherein at least some of said semantic representations are delicensed based upon a lack of semantic coherence between them.

40. The search system of claim 39, wherein said licensing is based at least in part upon a statistical distributions of concepts associated with said semantic representations.

41. The search system of claim 39, wherein said licensing is based at least in part upon a set of contextual information.

42. The search system of claim 38, wherein said delicensing is based at least in part upon a set of contextual information.

43. The search system of claim 35, further comprising matching an advertisement to at least some of said semantic representations, and displaying said advertisement to a user of at least one of said computing devices.

* * * * *